(12) United States Patent
Miyazaki et al.

(10) Patent No.: US 12,157,622 B2
(45) Date of Patent: Dec. 3, 2024

(54) THERMAL INSULATION CONTAINER AND HEAT/COLD INSULATION APPARATUS USING THE SAME

(71) Applicants: JAPAN AEROSPACE EXPLORATION AGENCY, Tokyo (JP); TIGER CORPORATION, Osaka (JP); TECHNOSOLVER CORPORATION, Fujisawa (JP)

(72) Inventors: Kazuhiro Miyazaki, Tokyo (JP); Ryuta Hatakenaka, Tokyo (JP); Kazuya Kitamoto, Tokyo (JP); Daisuke Horii, Osaka (JP); Kazuyuki Nakamura, Fujisawa (JP)

(73) Assignees: JAPAN AEROSPACE EXPLORATION AGENCY, Tokyo (JP); TIGER CORPORATION, Osaka (JP); TECHNOSOLVER CORPORATION, Fujisawa (JP)

(*) Notice: Subject to any disclaimer, the term of this patent is extended or adjusted under 35 U.S.C. 154(b) by 876 days.

(21) Appl. No.: 16/498,890

(22) PCT Filed: Mar. 27, 2018

(86) PCT No.: PCT/JP2018/012397
§ 371 (c)(1),
(2) Date: Sep. 27, 2019

(87) PCT Pub. No.: WO2018/181291
PCT Pub. Date: Oct. 4, 2018

(65) Prior Publication Data
US 2021/0107723 A1    Apr. 15, 2021

(30) Foreign Application Priority Data

Mar. 28, 2017  (JP) .................................. 2017-062193

(51) Int. Cl.
*B65D 81/38* (2006.01)
*A47J 41/02* (2006.01)

(52) U.S. Cl.
CPC ........ *B65D 81/3818* (2013.01); *A47J 41/022* (2013.01)

(58) Field of Classification Search
CPC .. B65D 81/3818; B65D 81/383; A47J 41/022; F25D 2331/804
See application file for complete search history.

(56) References Cited

U.S. PATENT DOCUMENTS 1,337,278 A * 4/1920 Schulz .................. A47J 41/022
                                                        220/592.27
4,981,234 A * 1/1991 Slaughter .................. F25D 3/08
                                                         220/592.2
(Continued)

FOREIGN PATENT DOCUMENTS

GB            695411 A       8/1953
GB         2475478 A  *  5/2011   ......... B65D 81/3855
(Continued)

OTHER PUBLICATIONS

English transaltion of JP2007008530A.*
(Continued)

*Primary Examiner* — Don M Anderson
(74) *Attorney, Agent, or Firm* — Saliwanchik, Lloyd & Eisenschenk

(57) ABSTRACT

[Object] To provide a thermal insulation container with which the heat/cold insulation effect is kept for longer time without increasing the size and weight of the thermal insulation container.
[Solving Means] The thermal insulation container includes an inner container, an outer container, and an overlap region. The inner container includes a first bottom portion, a first side wall portion that extends in a first direction from the
(Continued)

first bottom portion and forms a first open end portion, and a first vacuum layer continuously formed inside the first bottom portion and the first side wall portion. The outer container includes a second bottom portion, a second side wall portion that extends in a second direction opposite to the first direction from the second bottom portion and forms a second open end portion, and a second vacuum layer continuously formed inside the second bottom portion and the second side wall portion. The outer container is fitted onto the inner container in such a manner that an inner surface of the second side wall portion and an outer surface of the first side wall portion face each other and forms a storage portion. The overlap region is formed in such a manner that the inner surface of the second side wall portion and the outer surface of the first side wall portion overlap each other.

17 Claims, 7 Drawing Sheets

(56) References Cited

U.S. PATENT DOCUMENTS

| 10,723,538 | B2* | 7/2020 | Reid | B23K 31/02 |
| 2007/0210090 | A1* | 9/2007 | Sixt | A01N 1/0273 |
| | | | | 220/592.03 |
| 2008/0006642 | A1* | 1/2008 | Hidary | B65D 81/382 |
| | | | | 220/592.2 |
| 2010/0200599 | A1* | 8/2010 | Molthen | B65D 19/06 |
| | | | | 220/592.27 |
| 2012/0305435 | A1* | 12/2012 | Matta | F25D 3/06 |
| | | | | 206/521 |
| 2015/0260332 | A1* | 9/2015 | Reid | B23K 1/0008 |
| | | | | 228/221 |

FOREIGN PATENT DOCUMENTS

| JP | 11-013063 Y | 9/1936 |
| JP | 59-101953 U | 7/1984 |
| JP | 09-215515 A | 8/1997 |
| JP | 2000-139702 A | 5/2000 |
| JP | 2004-217290 A | 8/2004 |
| JP | 2006-335390 A | 12/2006 |
| JP | 2007-008530 A | 1/2007 |
| JP | 2008-237589 A | 10/2008 |
| JP | 3187215 U | 11/2013 |
| JP | 3206726 U | 9/2016 |
| WO | WO-2005/108883 A1 | 11/2005 |

OTHER PUBLICATIONS

International Search Report dated Jun. 26, 2018 in International Application No. PCT/JP2018/012397, along with its English translation.
International Preliminary Examination Report dated Jun. 27, 2019 in International Application No. PCT/JP2018/012397.
International Preliminary Examination Report dated Jun. 27, 2019 in International Application No. PCT/JP2018/012397, along with its English translation.
Office Action dated Oct. 1, 2020 in Japanese Application No. 2017-062193, along with its English translation.

* cited by examiner

THERMAL INSULATION CONTAINER AND HEAT/COLD INSULATION APPARATUS USING THE SAME

CROSS-REFERENCE TO RELATED APPLICATIONS

This application is the U.S. national stage application of International Patent Application No. PCT/JP2018/012397, filed Mar. 27, 2018, which claims the benefit under 35 U.S.C. § 119 of Japanese Patent Application No. 2017-062193, filed Mar. 28, 2017, the disclosures of each of which are incorporated herein by reference in their entirety.

TECHNICAL FIELD

The present invention relates to a thermal insulation container having a vacuum thermal insulation structure and to a heat/cold insulation apparatus using the same.

BACKGROUND ART

There is known a thermal insulation container having a vacuum thermal insulation structure in which internal and external spaces are divided via a vacuum layer (e.g., see Patent Literatures 1 and 2). The thermal insulation container having the vacuum thermal insulation structure is configured by highly air-tightly fitting a thermally insulative lid to an opening of a container body forming a tubular shape with a bottom. Such a thermal insulation container is excellent in thermal insulation performance. Therefore, those thermal insulation containers are widely used for applications in which heat/cold insulation performance is required, such as a water bottle, an electric kettle, and a lunch box, for example.

CITATION LIST

Patent Literature

Patent Literature 1: Japanese Patent Application Laid-open No. HEI 9-215515
Patent Literature 2: Japanese Patent Application Laid-open No. 2000-139702

DISCLOSURE OF INVENTION

Technical Problem

In a general thermal insulation container in which a thermally insulative lid is removably fitted to an opening of a container body, thermal insulation is provided in such a manner that air leakage between the inside and outside of the container is inhibited by highly air-tightly fitting the lid to the container body. However, in a case where electric power is not used, the heat/cold insulation time is limited in a manner that depends on mainly the thermal insulation performance of the thermal insulation container and the thermal storage capacity of a heat or cold insulator put inside. If the duration of the heat/cold insulation effect of the thermal insulation container can be prolonged, the applications of the thermal insulation container are further increased. For example, if a thermal insulation container whose cold insulation effect can be kept for several days or more can be provided, the thermal insulation container can also be used as a container for recovering a refrigerated object to the globe from the International Space Station without using a cooling apparatus. On the other hand, if the amount of thermal insulation material or the thickness of the thermal insulation material is increased for improving the thermal insulation performance of the box of the thermal insulation container or many thermal storage members are used for improving the heat and cold insulation performance of the inside, the applications are limited because of the increase in size and weight of the thermal insulation container.

In order to solve the above-mentioned problem, it is an object of the present invention to provide a thermal insulation container whose heat/cold insulation effect is kept for longer time without increasing the size and weight of the thermal insulation container and a heat/cold insulation apparatus using the same.

Solution to Problem

In order to accomplish the above-mentioned object, a thermal insulation container according to an embodiment of the present invention includes an inner container, an outer container, and an overlap region.

The inner container includes a first bottom portion, a first side wall portion that extends in a first direction from the first bottom portion and forms a first open end portion, and a first vacuum layer continuously formed inside the first bottom portion and the first side wall portion.

The outer container includes a second bottom portion, a second side wall portion that extends in a second direction opposite to the first direction from the second bottom portion and forms a second open end portion, and a second vacuum layer continuously formed inside the second bottom portion and the second side wall portion, the outer container being fitted onto the inner container in such a manner that an inner surface of the second side wall portion and an outer surface of the first side wall portion face each other and forming a storage portion.

The overlap region is formed in such a manner that the inner surface of the second side wall portion and the outer surface of the first side wall portion overlap each other.

An end portion of the overlap region in the first direction may be adjacent to the second bottom portion and an end portion of the overlap region in the second direction may be adjacent to the first bottom portion. The overlap region may be formed over entire peripheries of the first side wall portion and the second side wall portion.

The thermal insulation container may further include a sealing member disposed between the outer surface of the first side wall portion and the inner surface of the second side wall portion in the overlap region.

The thermal insulation container may further include a buffering material disposed between the first side wall portion and the second bottom portion.

The thermal insulation container may further include a fixation portion for inhibiting relative movement of the inner container and the outer container in the first and second directions.

A heat/cold insulation apparatus according to an embodiment of the present invention includes an inner container, an outer container, an overlap region, a heat/cold insulation portion, and a thermal storage member.

The inner container includes a first bottom portion, a first side wall portion that extends in a first direction from the first bottom portion and forms a first open end portion, and a first vacuum layer continuously formed inside the first bottom portion and the first side wall portion.

The outer container includes a second bottom portion, a second side wall portion that extends in a second direction opposite to the first direction from the second bottom portion and forms a second open end portion, and a second vacuum layer continuously formed inside the second bottom portion and the second side wall portion, the outer container being fitted onto the inner container in such a manner that an inner surface of the second side wall portion and an outer surface of the first side wall portion face each other and forming a storage portion.

The overlap region is formed in such a manner that an inner surface of the second side wall portion and an outer surface of the first side wall portion overlap each other.

The storage portion is formed inside the inner container and the outer container.

The heat/cold insulation portion is disposed inside the storage portion, an object to be heat-insulated or cold-insulated being disposed in the heat/cold insulation portion.

The thermal storage member is disposed around the heat/cold insulation portion.

The heat/cold insulation portion may be disposed at a position spaced apart from the first open end portion of the overlap region inside the storage portion, the heat/cold insulation portion being disposed via the thermal storage member.

Advantageous Effects of Invention

In accordance with the present invention, the second side wall portion and the first side wall portion overlap each other and form the overlap region that provides thermal resistance between the inner surface of the first side wall portion and the outer surface of the second side wall portion. Therefore, thermal resistance of a thermal conduction path in a region sandwiched by the first and second vacuum layers of the overlap region sufficiently increases. Accordingly, heat leakage between the storage portion and an external space can be suppressed. Therefore, improved thermal insulation performance can be provided without increasing the size and weight of the thermal insulation container.

MODE(S) FOR CARRYING OUT THE INVENTION

Hereinafter, an embodiment of the present invention will be described with reference to the drawings. However, the present invention should not be construed as being limitative due to the embodiment below. Further, in each of the figures, an X-axis, a Y-axis, and a Z-axis orthogonal to one another are shown. The X-axis, the Y-axis, and the Z-axis are common in all the figures.

1. Configuration of Thermal Insulation Container 1

1.1 Overall Configuration

Figure 1:
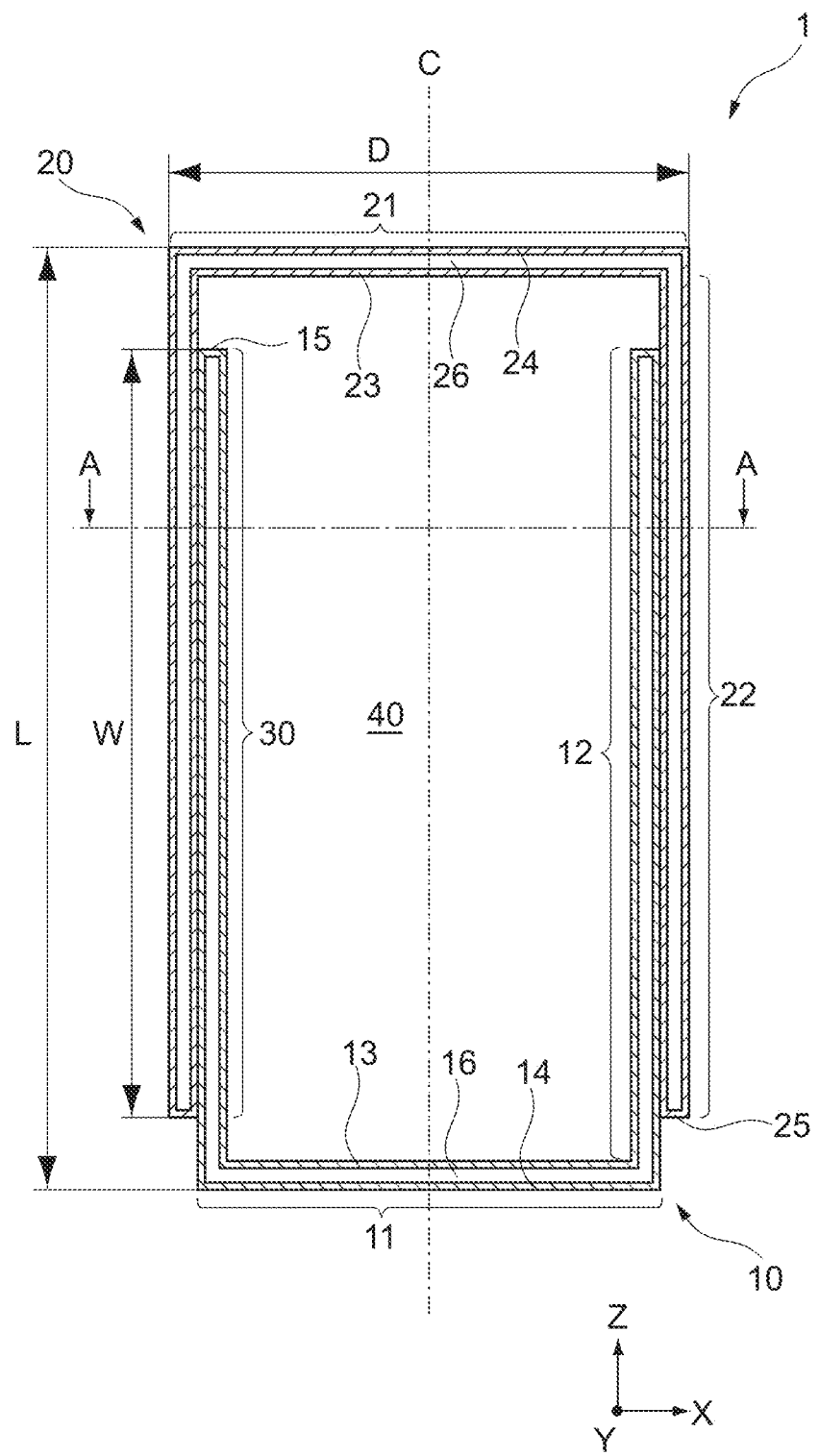
FIG. 1 A longitudinal cross-sectional view of a thermal insulation container according to an embodiment of the present invention.
Figure 2:
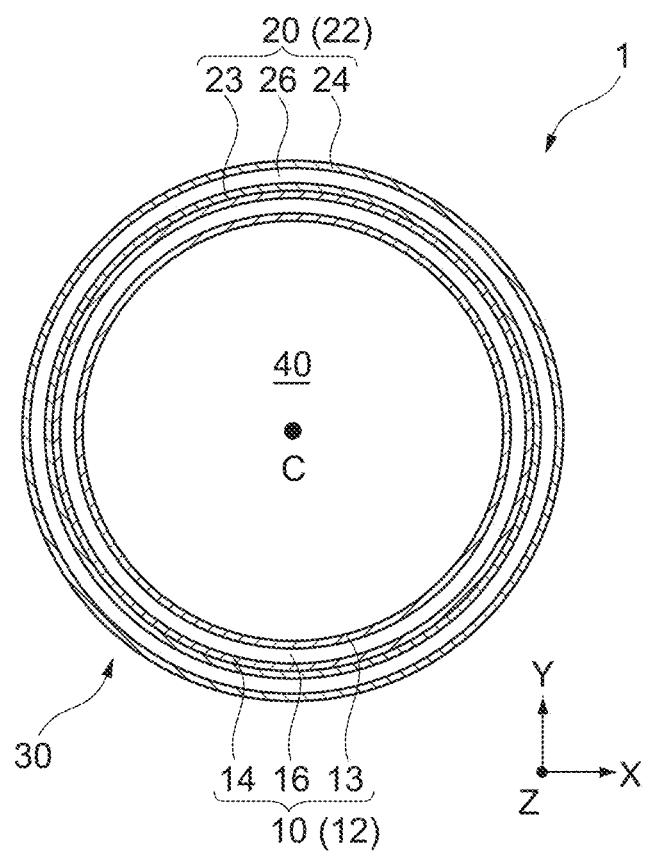
FIG. 2 A lateral cross-sectional view of the thermal insulation container, which is taken along the line A-A of FIG. 1.

FIG. 1 is a longitudinal cross-sectional view of a thermal insulation container 1 according to the embodiment of the present invention. The thermal insulation container 1 is formed in a hollow columnar shape having a center axis C parallel to the Z-axis as a center thereof. Specifically, FIG. 1 shows a cross-section along the center axis C of the thermal insulation container 1. FIG. 2 is a lateral cross-sectional view of the thermal insulation container 1, which is taken along the line A-A of FIG. 1. The thermal insulation container 1 includes an inner container 10 and an outer container 20.

The inner container 10 includes a bottom portion 11, a side wall portion 12, and an open end portion 15. The bottom portion 11 has a disk shape extending along an X-Y plane. The side wall portion 12 extends upward in the Z-axis direction in a cylindrical form from an outer edge portion of the bottom portion 11. The inner container 10 is opened upward in the Z-axis direction at the open end portion 15 at an upper end portion in the Z-axis direction.

The bottom portion 11 and the side wall portion 12 of the inner container 10 are constituted by an inside member 13 that constitutes an inner surface and an outside member 14 that constitutes an outer surface. The inside member 13 and the outside member 14 are spaced apart from each other in the Z-axis direction at the bottom portion 11. The inside member 13 and the outside member 14 are spaced apart from each other in a radial direction orthogonal to the Z-axis direction at the side wall portion 12. The inside member 13 and the outside member 14 are sealed by welding or the like at the open end portion 15.

Accordingly, a vacuum layer 16 which is a hermetically sealed space is formed between the inside member 13 and the outside member 14. The vacuum layer 16 is continuously formed inside the entire region of the bottom portion 11 and the side wall portion 12, excluding the open end portion 15. That is, the inside member 13 and the outside member 14 are isolated from each other by the vacuum layer 16, excluding a region at the open end portion 15.

The vacuum layer 16 of the inner container 10 is at an air pressure lower than the atmospheric pressure. Accordingly, the inside member 13 and the outside member 14 are thermally insulated from each other at the bottom portion 11 and the side wall portion 12. Therefore, in the inner container 10, improved thermal insulation performance can be provided in thickness directions of the bottom portion 11 and the side wall portion 12.

The outer container 20 includes a bottom portion 21, a side wall portion 22, and an open end portion 25. The bottom portion 21 has a disk shape extending along the X-Y plane. The side wall portion 22 extends downward in the Z-axis direction in a cylindrical form from an outer edge portion of the bottom portion 21. The outer container 20 is opened downward in the Z-axis direction at the open end portion 25 at a lower end portion in the Z-axis direction.

The bottom portion 21 and the side wall portion 22 of the outer container 20 are constituted by an inside member 23 that constitutes an inner surface and an outside member 24 that constitutes an outer surface. The inside member 23 and the outside member 24 are spaced apart from each other in the Z-axis direction at the bottom portion 21. The inside member 23 and the outside member 24 are spaced apart from each other in the radial direction orthogonal to the Z-axis direction at the side wall portion 22. The inside member 23 and the outside member 24 are sealed by welding or the like at the open end portion 25.

Accordingly, a vacuum layer 26 which is a hermetically sealed space is formed between the inside member 23 and the outside member 24. The vacuum layer 26 is continuously formed inside the entire region of the bottom portion 21 and the side wall portion 22, excluding the open end portion 25. That is, the inside member 23 and the outside member 24 are isolated from each other by the vacuum layer 26, excluding a region at the open end portion 25.

The vacuum layer 26 of the outer container 20 is at an air pressure lower than the atmospheric pressure. Accordingly, the inside member 23 and the outside member 24 are thermally insulated from each other at the bottom portion 21 and the side wall portion 22. Therefore, in the outer container 20, improved thermal insulation performance can be provided in thickness directions of the bottom portion 21 and the side wall portion 22.

It should be noted that configurations of the vacuum layer 16 of the inner container 10 and the vacuum layer 26 of the outer container 20 can be determined as appropriate. For example, the thickness of the vacuum layers 16 and 26 can be determined as long as sufficient thermal insulation performance can be provided and the inner container 10 and the outer container 20 can each have a required shape. Further, the degree of vacuum of the vacuum layers 16 and 26 can be determined as long as sufficient thermal insulation performance can be provided.

The side wall portion 12 of the inner container 10 is formed to have an outer diameter slightly smaller than an inner diameter of the side wall portion 22 of the outer container 20. The thermal insulation container 1 includes an overlap region 30 in which the side wall portion 22 of the outer container 20 overlaps the side wall portion 12 of the inner container 10 from the outside with substantially no clearance. That is, in the thermal insulation container 1, the inner container 10 and the outer container 20 are fitted to each other in the Z-axis direction.

In the thermal insulation container 1, a storage portion 40 isolated from the external space is formed inside the inner container 10 and the outer container 20 in such a manner that the inner container 10 and the outer container 20 are closed to each other at the overlap region 30. An object to be heat-insulated or cold-insulated and the like are stored in the storage portion 40 defined by the inner container 10 and the outer container 20.

In the thermal insulation container 1, the storage portion 40 can be opened by an operation of pulling the inner container 10 and the outer container 20 away from each other in the Z-axis direction. That is, in the thermal insulation container 1, the storage portion 40 can be freely closed and opened by an operation of relative movement of the inner container 10 and the outer container 20 in the Z-axis direction in order to take or put the object to be heat-insulated or cold-insulated and the like.

In the thermal insulation container 1, the entire periphery of the storage portion 40 is isolated from the external space by at least one of the vacuum layer 16 of the inner container 10 or the vacuum layer 26 of the outer container 20. That is, in the thermal insulation container 1, the entire periphery of the storage portion 40 is thermally insulated from the external space by at least one of the vacuum layer 16 of the inner container 10 or the vacuum layer 26 of the outer container 20.

Further, in the thermal insulation container 1, the side wall portion 12 of the inner container 10 and the side wall portion 22 of the outer container 20 overlap each other in the overlap region 30 with substantially no clearance. Therefore, heat transfer caused by convection between the side wall portion 12 of the inner container 10 and the side wall portion 22 of the outer container 20 can be suppressed. In the thermal insulation container 1, improved thermal insulation performance can be thus provided.

Figure 3:
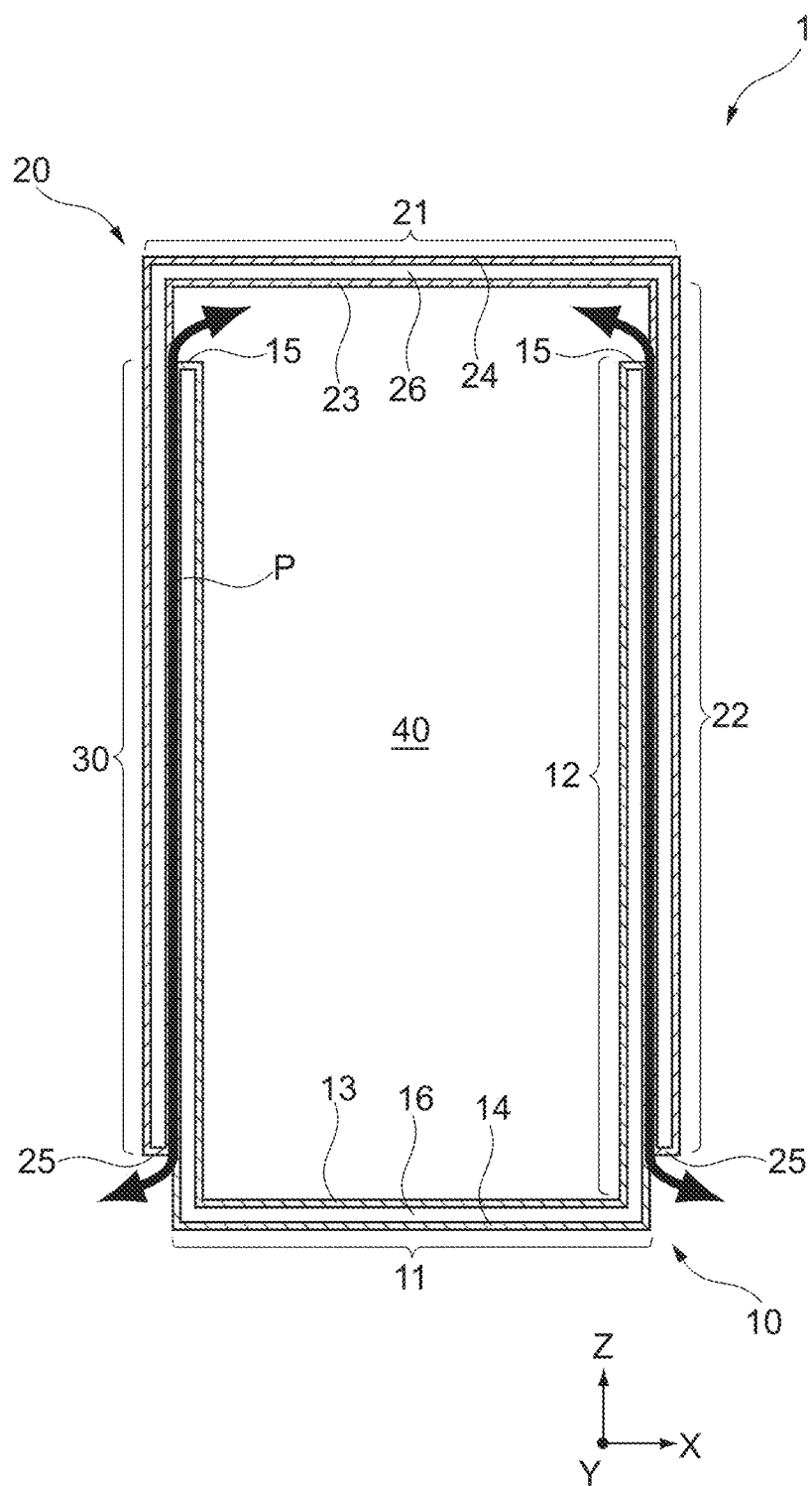
FIG. 3 A longitudinal cross-sectional view showing a thermal conduction path between a storage portion in the thermal insulation container and an external space.

On the other side, as shown in FIG. 3, in the thermal insulation container 1, a thermal conduction path P that generates heat leakage between the storage portion 40 and the external space is formed. The thermal conduction path P extends in the Z-axis direction between the vacuum layers 16 and 26 in the overlap region 30. The thermal conduction path P provides thermally connection between the storage portion 40 and the external space in the Z-axis direction.

In the thermal conduction path P, the open end portions 15 and 25 which are the upper end portion and the lower end portion of the overlap region 30 in the Z-axis direction are used as heat input and output ports. Then, heat transfer in the Z-axis direction along the outside member 14 of the inner container 10 and the inside member 23 of the outer container 20 is caused. In the thermal insulation container 1, the thermal insulation performance becomes lower as heat transfer is more easily caused in the Z-axis direction in the thermal conduction path P.

In view of this point, the thermal conduction path P is made long in the Z-axis direction by increasing a dimension W (see FIG. 1) in the Z-axis direction of the overlap region 30 in the thermal insulation container 1. Accordingly, the thermal resistance in the Z-axis direction in the thermal conduction path P increases. Therefore, in the thermal insulation container 1, heat transfer in the Z-axis direction can be suppressed. Therefore, further improved thermal insulation performance can be provided.

In the thermal insulation container 1, the proportion of the dimension W in the Z-axis direction of the overlap region 30 to a dimension L in the Z-axis direction is favorably larger. That is, in the thermal insulation container 1, it is favorable that the open end portion 15 of the inner container 10 is disposed at a position adjacent to the bottom portion 21 of the outer container 20 and the open end portion 25 of the outer container 20 is disposed at a position adjacent to the bottom portion 11 of the inner container 10.

Further, in the thermal insulation container 1, a cross-sectional area of the thermal conduction path P, which is orthogonal to the Z-axis direction, becomes larger as a dimension D in the radial direction orthogonal to the Z-axis direction becomes larger. Therefore, thermal resistance of the thermal conduction path P in the Z-axis direction generally becomes lower. Therefore, it is favorable to set the dimension W in the Z-axis direction of the overlap region 30 to be larger as the dimension D in the radial direction orthogonal to the Z-axis direction in the thermal insulation container 1 becomes larger.

With such a configuration, in the thermal insulation container 1, heat leakage between the storage portion 40 and the external space can be suppressed. Therefore, in the thermal insulation container 1, the heat/cold insulation effect inside the storage portion 40 is kept for longer time. Further, in the thermal insulation container 1, it is unnecessary to use a heavy and thick thermal insulation material and electric power. Therefore, a light-weight and small configuration can be provided.

1.2 Modified Example of Thermal Insulation Container 1

Figure 4A:
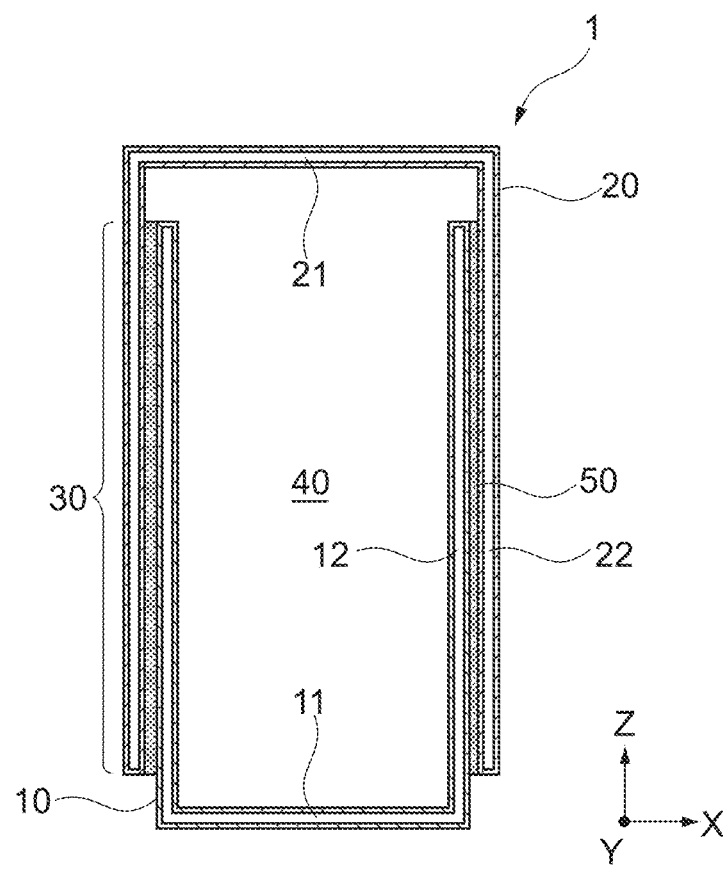
FIG. 4A A longitudinal cross-sectional view of Modified Example 1 of the thermal insulation container.

FIG. 4A is a longitudinal cross-sectional view of a thermal insulation container 1 according to Modified Example 1 of this embodiment. In the thermal insulation container 1 according to Modified Example 1, a sealing member 50 is provided in the overlap region 30. The sealing member 50 seals between the side wall portion 12 of the inner container 10 and the side wall portion 22 of the outer container 20. The sealing member 50 can be formed of various rubbers, various resins, and the like, for example.

In the thermal insulation container 1 according to Modified Example 1, the sealing member 50 more reliably seals an area between the side wall portion 12 of the inner container 10 and the side wall portion 22 of the outer container 20. Accordingly, in the thermal insulation container 1 in which the sealing member 50 is provided, heat transfer caused by convection between the side wall portion 12 of the inner container 10 and the side wall portion 22 of the outer container 20 can be more effectively suppressed.

Figure 4B:
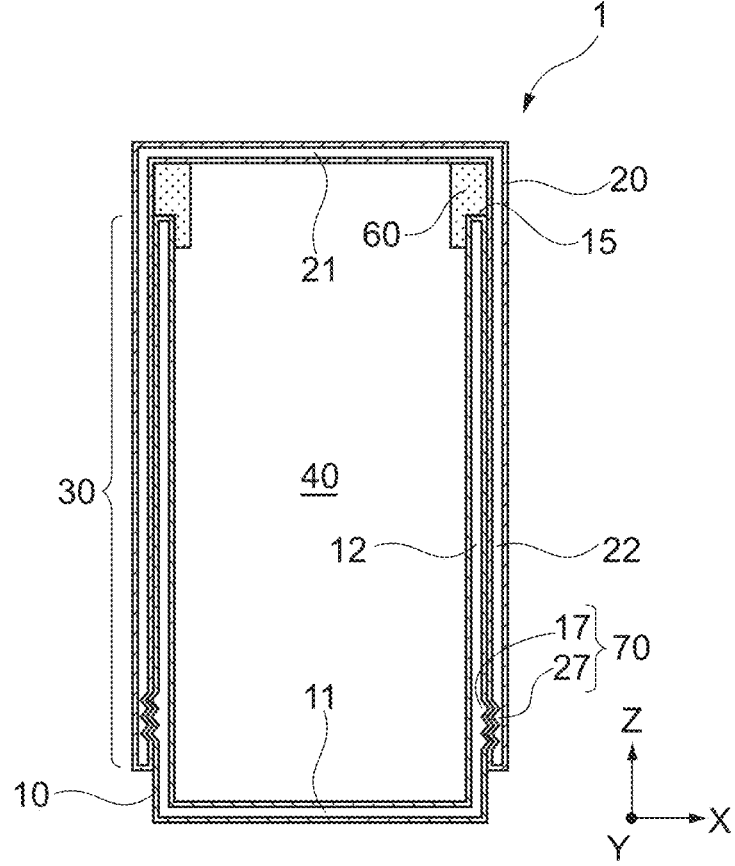
FIG. 4B A longitudinal cross-sectional view of Modified Example 2 of the thermal insulation container.

FIG. 4B is a longitudinal cross-sectional view of a thermal insulation container 1 according to Modified Example 2 of this embodiment. In the thermal insulation container 1 according to Modified Example 2, a buffering material 60 is provided. The buffering material 60 is provided disposed between the open end portion 15 of the inner container 10 and an inner surface of the bottom portion 21 of the outer container 20. The buffering material 60 can be formed of various rubbers, various resins, and the like, for example.

In the thermal insulation container 1 according to Modified Example 2, the buffering material 60 can inhibit contact of the open end portion 15 of the inner container 10 with the bottom portion 21 of the outer container 20. Accordingly, in the thermal insulation container 1 in which the buffering material 60 is provided, the bottom portion 21 of the outer container 20 and the open end portion 15 of the inner container 10 can be inhibited from being damaged even if those receive vibration or impact from the outside.

Further, a fixation portion 70 is provided in the overlap region 30 of the thermal insulation container 1 according to Modified Example 2 in such a manner that the inner container 10 and the outer container 20 are engaged with each other. The fixation portion 70 inhibits relative movement in the Z-axis direction. The fixation portion 70 is constituted by a thread ridge portion 17 and a thread groove portion 27. The thread ridge portion 17 is provided in an outer surface of the inner container 10. The thread groove portion 27 is provided in an inner surface of the outer container 20.

In the thermal insulation container 1 according to Modified Example 2, the inner container 10 and the outer container 20 can be fixed relative to each other in the Z-axis direction by screwing the inner container 10 and the outer container 20 to each other so as to engage the thread ridge portion 17 and the thread groove portion 27 with each other. It should be noted that the fixation portion 70 is not limited to such a configuration as long as the fixation portion 70 can fix the inner container 10 and the outer container 20 relative to each other in the Z-axis direction.

Further, if a seal such as a rubber O-ring is provided in the portion of the buffering material 60, the inner container 10 and the outer container 20 move relative to each other in the Z-axis direction due to fixation of threads, and liquid and gas can be inhibited from flowing between the inner container 10 and the outer container 20. The storage portion 40 can be air-tightly sealed. Further, rather than providing a seal between the inner container 10 and the outer container 20, the airtightness can also be secured by accommodating the entire thermal insulation container 1 in a highly airtight container.

2. Applications of Thermal Insulation Container 1

2.1 Overview

The thermal insulation container 1 can be widely used for applications that require heat/cold insulation performance. For example, the thermal insulation container 1 can be used as a beverage or food container such as a water bottle and a lunch box. In the thermal insulation container 1 used as the beverage or food container, high heat/cold insulation performance can be provided without using electric power and it can be configured to be light-weight and small. Therefore, excellent portability can be achieved.

Further, the thermal insulation container 1 can be used as a container for transportation in transporting a small cargo that requires temperature control for long time. For example, the thermal insulation container 1 can be used for transporting medical samples and samples for life sciences research (vaccines, bone marrow aspirate for transplantation, microbes (bacteria, viruses, and the like) and the like) for long time.

Moreover, the thermal insulation container 1 can be used as a storage tank of an apparatus that supplies hot water or warm water, such as an electric kettle and the EcoCute, for example. In those apparatuses, power consumption for keeping the temperature of hot water or warm water in the storage tank can be greatly reduced by using the thermal insulation container 1 as the storage tank.

In addition, the thermal insulation container 1 can be used as a vehicle-mounted warm water-supplying tank that keeps warm water in the automobile. That is, by generating warm water in the thermal insulation container 1 by utilizing heat generated in traveling of the automobile, lowering of the temperature of warm water in the thermal insulation container 1 in parking is suppressed. This warm water can be used for overcoming freezing of the windshield in using the car next time, for example.

The thermal insulation container 1 uses a thermal storage member 110 such as a heat insulator and a cold insulator. In this manner, it is possible to keep the temperature constant for a long period and to keep the heat/cold insulation effect for longer time. That is, a heat/cold insulation apparatus 100 more excellent in heat/cold insulation performance can be configured by combining the thermal insulation container 1 with the thermal storage member 110. Hereinafter, the heat/cold insulation apparatus 100 will be described.

2.2 Heat/Cold Insulation Apparatus 100

Figure 5:
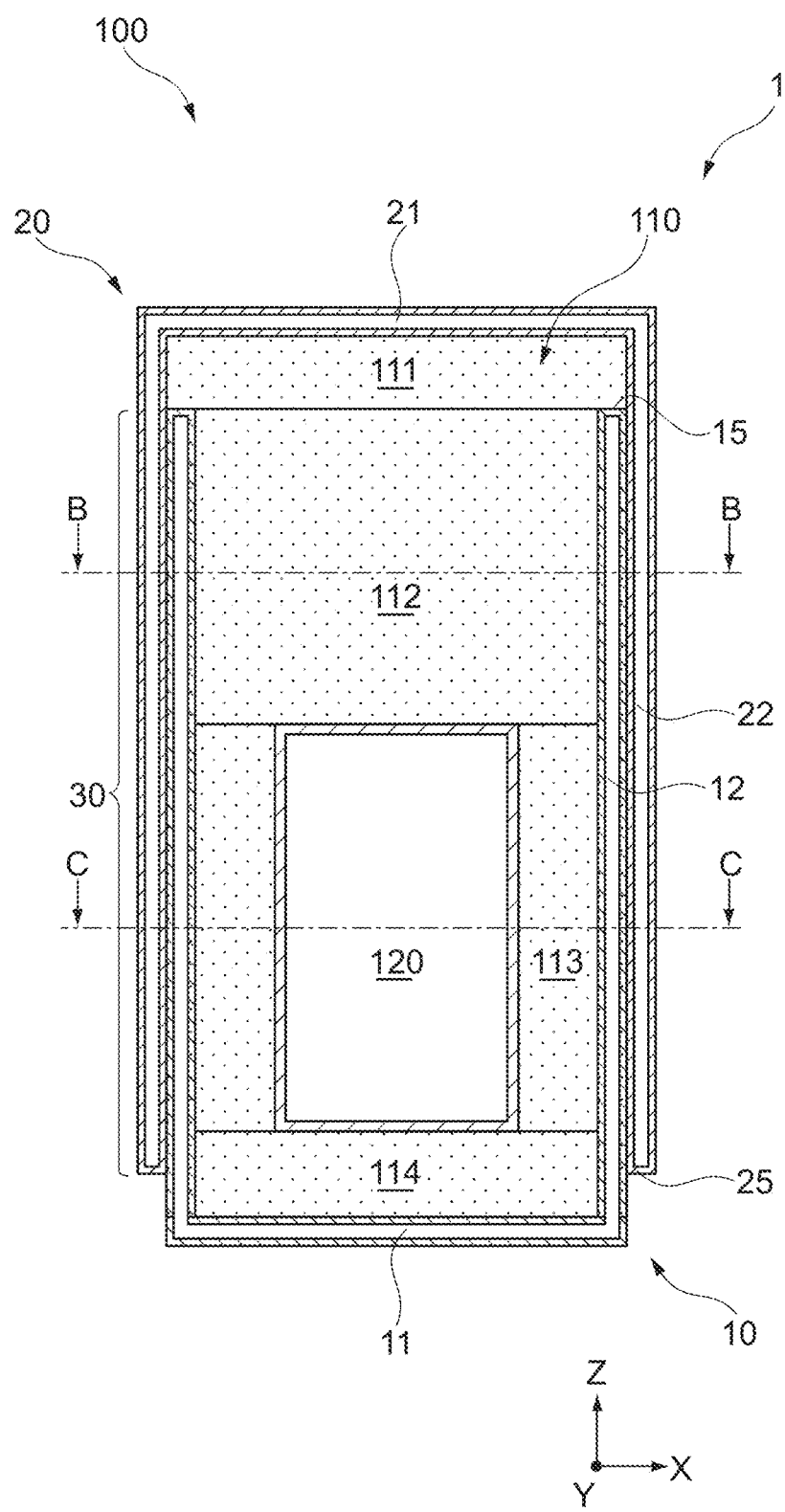
FIG. 5 A longitudinal cross-sectional view of a heat/cold insulation apparatus according to an embodiment of the present invention.

FIG. 5 is a longitudinal cross-sectional view of the heat/cold insulation apparatus 100. The heat/cold insulation apparatus 100 includes the thermal insulation container 1, the thermal storage member 110, and a heat/cold insulation portion 120. The thermal storage member 110 and the heat/cold insulation portion 120 are disposed inside the storage portion 40 of the thermal insulation container 1. The heat/cold insulation portion 120 is configured as a casing member capable of accommodating an object to be heat-insulated or cold-insulated, for example. The shape of the heat/cold insulation portion 120 can be arbitrarily determined and a columnar shape, a spherical shape, or the like, for example, may be used other than a rectangular parallelepiped shape shown in FIG. 5.

The thermal storage member 110 is configured as the heat insulator or the cold insulator for retaining the heat/cold insulation portion 120 at a predetermined temperature. A latent thermal storage member using solid-liquid phase transition is used as the thermal storage member 110. A configuration in which a casing having a predetermined shape is filled with a latent thermal storage material, for example, can be employed for the thermal storage member 110.

In the thermal storage member 110, a material having a melting point depending on a kept temperature of the heat/cold insulation portion 120 is selected as the latent thermal storage material for filling the casing. Accordingly, in the heat/cold insulation apparatus 100, the heat/cold insulation portion 120 can be held at an arbitrary temperature. It should be noted that the thermal storage member 110 is not limited to the latent thermal storage member and a sensible thermal storage member, a chemical thermal storage member, or the like, for example, may be used.

The thermal storage member 110 is disposed in the periphery of the heat/cold insulation portion 120 in the storage portion 40. In the thermal insulation container 1, the heat/cold insulation portion 120 is favorably disposed at a position closer to the bottom portion 11 of the inner container 10. Accordingly, the heat/cold insulation portion 120 is farther from the open end portion 15 which is a connection port of the thermal conduction path P shown in FIG. 3. Therefore, it becomes difficult for the heat/cold insulation portion 120 to change in temperature.

In order to provide further improved heat/cold insulation performance in the heat/cold insulation apparatus 100, the thermal storage member 110 is favorably spread in the entire periphery of the heat/cold insulation portion 120 in the storage portion 40 as shown in FIG. 5. However, it is also possible to adjust the amount of thermal storage member 110 to be smaller in a manner that depends on demands of weight reduction and the like and the heat/cold insulation performance demanded for the heat/cold insulation apparatus 100.

The thermal storage member 110 is favorably small from the perspective of easiness to handle in heating, cooling, and the like before storage in the storage portion 40 of the thermal insulation container 1. From those perspectives, the thermal storage member 110 can be configured to be divided in a plurality of parts.

For example, as shown in FIG. 5, the thermal storage member 110 may be divided in the Z-axis direction. The thermal storage member 110 shown in FIG. 5 is divided into four parts in the Z-axis direction and is constituted by the thermal storage members 111, 112, 113, and 114. Moreover, the thermal storage member 110 may be divided also in the radial direction orthogonal to the Z-axis direction as shown in FIGS. 6A and 6B.

Figure 6A:
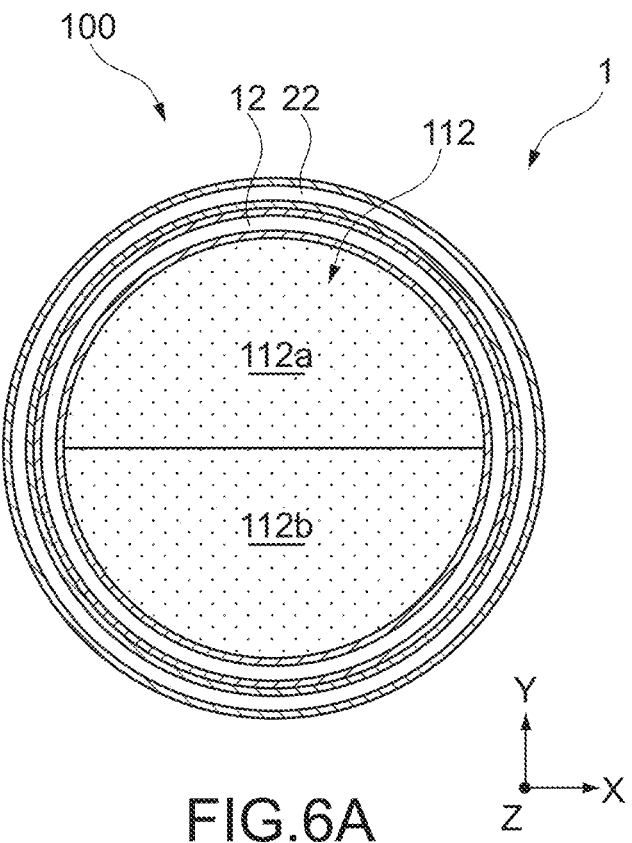
FIG. 6A A lateral cross-sectional view of the heat/cold insulation apparatus, which is taken along the line B-B of FIG. 5.

FIG. 6A is a lateral cross-sectional view which is taken along the line B-B of FIG. 5 and shows a lateral cross-section of the thermal storage member 112. The thermal storage member 112 is divided into two parts at the center portion in the Y-axis direction and is constituted by thermal storage members 112a and 112b. Further, as in the thermal storage member 112, the thermal storage members 111 and 114 may be divided into two parts at the center portion in the Y-axis direction.

Figure 6B:
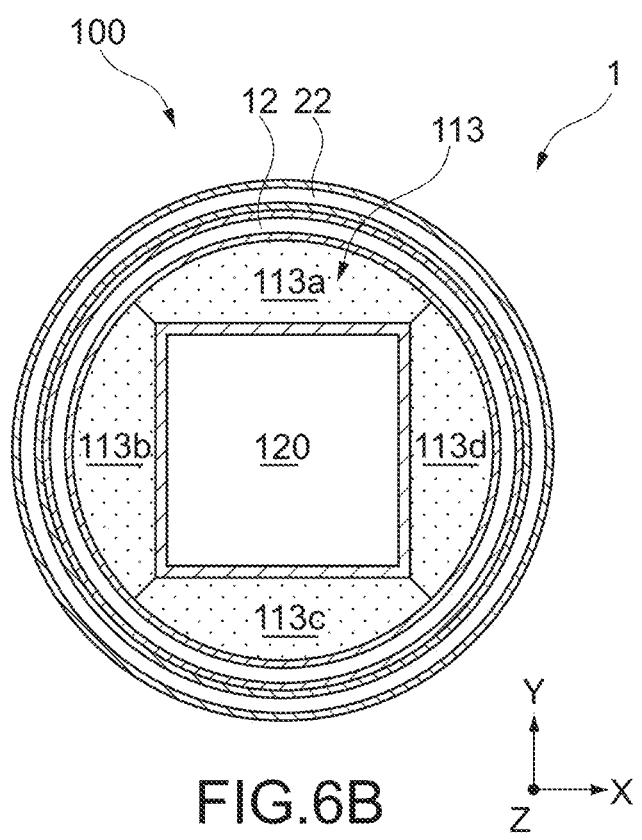
FIG. 6B A lateral cross-sectional view of the heat/cold insulation apparatus, which is taken along the line C-C of FIG. 5.

FIG. 6B is a lateral cross-sectional view which is taken along the line C-C of FIG. 5 and shows a lateral cross-section of the thermal storage member 113. The thermal storage member 113 is divided into four parts in the radial direction orthogonal to the Z-axis direction in the four corners of the heat/cold insulation portion 120 and is constituted by thermal storage members 113a, 113b, 113c, and 113d. It should be noted that the form of division of the thermal storage member 110 is not limited to the above and can be variously modified.

Combined with the thermal storage member 110 and configured as the heat/cold insulation apparatus 100, the thermal insulation container 1 is capable of keeping the heat/cold insulation effect for several days or more. Accordingly, the thermal insulation container 1 can be used for a novel application which cannot be achieved by a general thermal insulation container. Hereinafter, a refrigerated-object recovery apparatus 200 will be described as an example of the novel application.

2.3 Refrigerated-Object Recovery Apparatus 200

Figure 7:
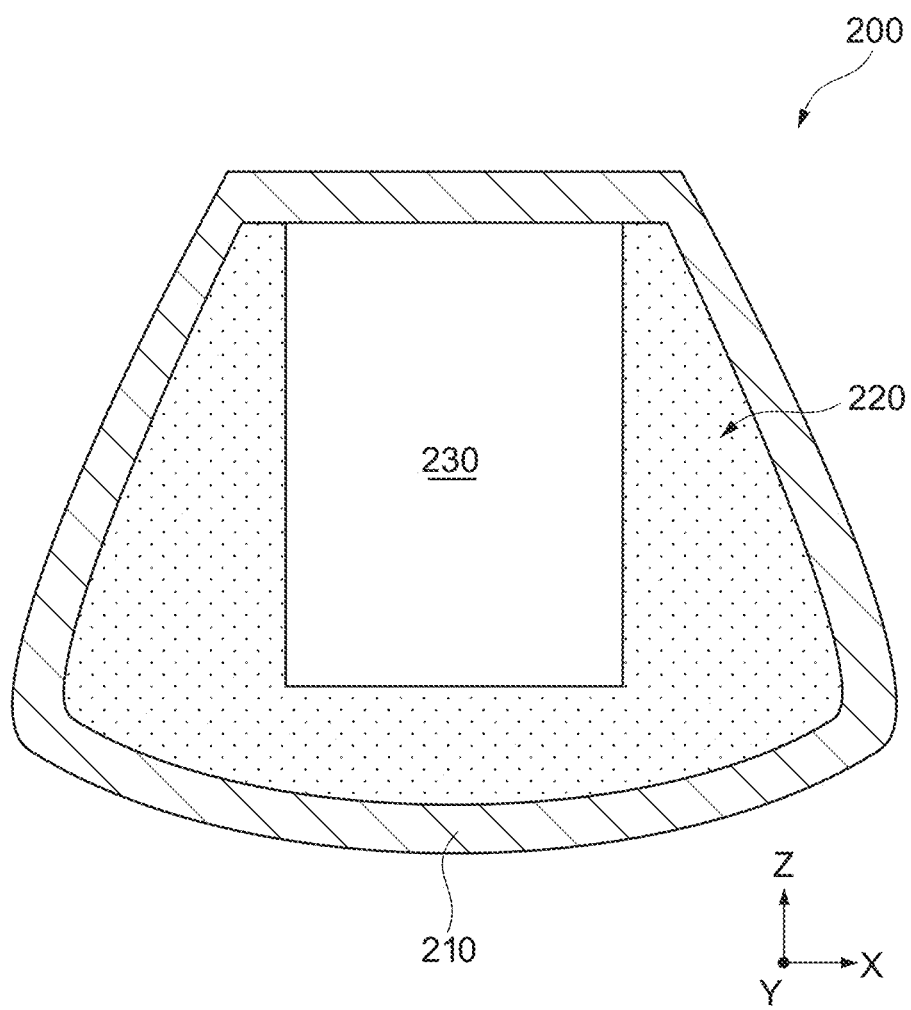
FIG. 7 A longitudinal cross-sectional view of a refrigerated-object recovery apparatus according to an embodiment of the present invention.

FIG. 7 is a longitudinal cross-sectional view showing a schematic configuration of the refrigerated-object recovery apparatus 200. The refrigerated-object recovery apparatus 200 is a spacecraft that re-enter the atmosphere of the globe from the space. The refrigerated-object recovery apparatus 200 is covered with a thermal protection material 210 for protecting the inside of the aircraft body from heat at the time of atmospheric re-entry. In an internal space 220, a parachute, a propulsion system device for attitude control, an electronic device, and the like are provided. A storage portion 230 for storing refrigerated re-entry object is also provided. The shape of a recovery apparatus is not limited to an axially symmetric capsule shape and it can be similarly applied even with a lifting body shape. In a case where a refrigerated object refrigerated and stored in the International Space Station (ISS) is recovered to the globe, a sample such as high-quality protein crystals synthesized in a state of weightlessness or the like, for example, can be exemplified as a refrigerated object stored in the storage portion 230.

By using the thermal insulation container 1 in a spacecraft in the form like the refrigerated-object recovery apparatus 200 in this manner, it becomes possible to recover the refrigerated object refrigerated and saved in the ISS to the globe in a state in which the temperature is kept constant without using electric power. Further, owing to the improved cold insulation performance of the thermal insulation container 1 in the refrigerated-object recovery apparatus 200 or the thermal insulation container according to a modification thereof, the cold insulation effect for the refrigerated object is kept for a long period even if a delay of the operation such as separation from the ISS or a delay of recovery due to influence of weather or the like in a recovery area in the globe for the refrigerated-object recovery apparatus 200 is caused. Therefore, a re-entry object such as a space experiment sample stored in the thermal insulation container 1 can be inhibited from being damaged due to an increase in temperature.

3. Other Embodiments

Hereinabove, although the embodiment of the present invention has been described, the present invention is not limited only to such an embodiment and various modifications can be made as a matter of course. For example, in the above embodiment, the thermal insulation container 1 has a columnar shape, though not limited thereto. Specifically, the thermal insulation container 1 may have a rectangular parallelepiped shape, a prism shape, an elliptic cylinder shape, or the like, for example.

REFERENCE SIGNS LIST 1 thermal insulation container
10 inner container 11 bottom portion
12 side wall portion
15 open end portion
16 vacuum layer
20 outer container
21 bottom portion
22 side wall portion
25 open end portion
26 vacuum layer
30 overlap region
40 storage portion
50 sealing member
60 buffering material
70 fixation portion
100 heat/cold insulation apparatus
110 thermal storage member
120 heat/cold insulation portion
200 refrigerated-object recovery apparatus
300 air-pressure keeping apparatus

The invention claimed is:

1. A thermal insulation container, comprising:
an inner container including
  a first bottom portion,
  a first side wall portion that extends in a first direction from the first bottom portion and forms a first open end portion, and
  a first vacuum layer continuously formed inside the first bottom portion and the first side wall portion;
an outer container including
  a second bottom portion whose inner surface is adjacent to the first open end portion,
  a second side wall portion that extends in a second direction opposite to the first direction from the second bottom portion and forms a second open end portion adjacent to an inner surface of the first bottom portion, and
  a second vacuum layer continuously formed inside the second bottom portion and the second side wall portion, the outer container being fitted onto the inner container in such a manner that an inner surface of the second side wall portion and an outer surface of the first side wall portion face each other and forming a storage portion;
an overlap region where the inner surface of the second side wall portion and the outer surface of the first side wall portion overlap each other, the overlap region having a length W in the first and second directions, the length W being larger than a length D of the thermal insulation container in a radial direction orthogonal to the first and second directions; and
a sealing member disposed between the outer surface of the first side wall portion and the inner surface of the second side wall portion, the sealing member being disposed in at least a majority of the overlap region, and the sealing member being configured to suppress heat transfer caused by convection between the outer surface of the first side wall portion and the inner surface of the second side wall portion.

2. The thermal insulation container according to claim 1, wherein the overlap region is formed over entire peripheries of the first side wall portion and the second side wall portion.

3. The thermal insulation container according to claim 1, further comprising a buffering material disposed between the first open end portion and the second bottom portion.

4. The thermal insulation container according to claim 1, further comprising a fixation portion for preventing relative movement of the inner container and the outer container in the first and second directions.

5. A heat/cold insulation apparatus, comprising:
an inner container including
  a first bottom portion,
  a first side wall portion that extends in a first direction from the first bottom portion and forms a first open end portion, and
  a first vacuum layer continuously formed inside the first bottom portion and the first side wall portion;
an outer container including
  a second bottom portion whose inner surface is adjacent to the first open end portion,
  a second side wall portion that extends in a second direction opposite to the first direction from the second bottom portion and forms a second open end portion adjacent to an inner surface of the first bottom portion, and
  a second vacuum layer continuously formed inside the second bottom portion and the second side wall portion, the outer container being fitted onto the inner container in such a manner that an inner surface of the second side wall portion and an outer surface of the first side wall portion face each other and forming a storage portion;
an overlap region where the inner surface of the second side wall portion and the outer surface of the first side wall portion overlap each other, the overlap region having a length W in the first and second directions, the length W being larger than a length D of the thermal insulation container in a radial direction orthogonal to the first and second directions;
a sealing member disposed between the outer surface of the first side wall portion and the inner surface of the second side wall portion, the sealing member being disposed in at least a majority of the overlap region, and the sealing member being configured to suppress heat transfer caused by convection between the outer surface of the first side wall portion and the inner surface of the second side wall portion;
a heat/cold insulation portion disposed inside the storage portion, an object to be heat-insulated or cold-insulated being disposed in the heat/cold insulation portion; and
a thermal storage member disposed around the heat/cold insulation portion.

6. The heat/cold insulation apparatus according to claim 5, wherein the heat/cold insulation portion is disposed to the first open end portion via the thermal storage member.

7. The heat/cold insulation apparatus according to claim 5, wherein the sealing member is a rubber sealing member.

8. The thermal insulation container according to claim 1, wherein the sealing member is a rubber sealing member.

9. The heat/cold insulation apparatus according to claim 7, wherein the thermal storage member disposed is divided in the first and second directions.

10. A heat/cold insulation apparatus, comprising:
an inner container including
  a first bottom portion,
  a first side wall portion that extends in a first direction from the first bottom portion and forms a first open end portion, and
  a first vacuum layer continuously formed inside the first bottom portion and the first side wall portion;
an outer container including
  a second bottom portion whose inner surface is adjacent to the first open end portion, a second side wall portion that extends in a second direction opposite to the first direction from the second bottom portion and forms a second open end portion adjacent to an inner surface of the first bottom portion, and a second vacuum layer continuously formed inside the second bottom portion and the second side wall portion, the outer container being fitted onto the inner container in such a manner that an inner surface of the second side wall portion and an outer surface of the first side wall portion face each other and forming a storage portion;

an overlap region where the inner surface of the second side wall portion and the outer surface of the first side wall portion overlap each other;

a heat/cold insulation portion disposed inside the storage portion, an object to be heat-insulated or cold-insulated being disposed in the heat/cold insulation portion; and a thermal storage member disposed inside the storage portion, the thermal storage member being disposed such that the heat/cold insulation portion is disposed at a position closer to the first bottom portion than it is to the first open end portion, so as to be closer to the first bottom portion than it is to a connection port of the thermal conduction path that provides thermal connection between the storage portion and external space.

11. The heat/cold insulation apparatus according to claim 10, wherein the thermal storage member is disposed around the heat/cold insulation portion.

12. The heat/cold insulation apparatus according to claim 11, wherein the thermal storage member is disposed around the heat/cold insulation portion in a radial direction orthogonal to the first and second directions.

13. The heat/cold insulation apparatus according to claim 10, wherein the overlap region is formed over entire peripheries of the first side wall portion and the second side wall portion.

14. The heat/cold insulation apparatus according to claim 10, further comprising a buffering material disposed between the first open end portion and the second bottom portion.

15. The heat/cold insulation apparatus according to claim 10, further comprising a fixation portion for preventing relative movement of the inner container and the outer container in the first and second directions.

16. The heat/cold insulation apparatus according to claim 10, further comprising a sealing member disposed between the outer surface of the first side wall portion and the inner surface of the second side wall portion, the sealing member being disposed in at least a majority of the overlap region, and the sealing member being configured to suppress heat transfer caused by convection between the outer surface of the first side wall portion and the inner surface of the second side wall portion.

17. The heat/cold insulation apparatus according to claim 16, wherein the sealing member is a rubber sealing member.

* * * * *